UNITED STATES PATENT OFFICE.

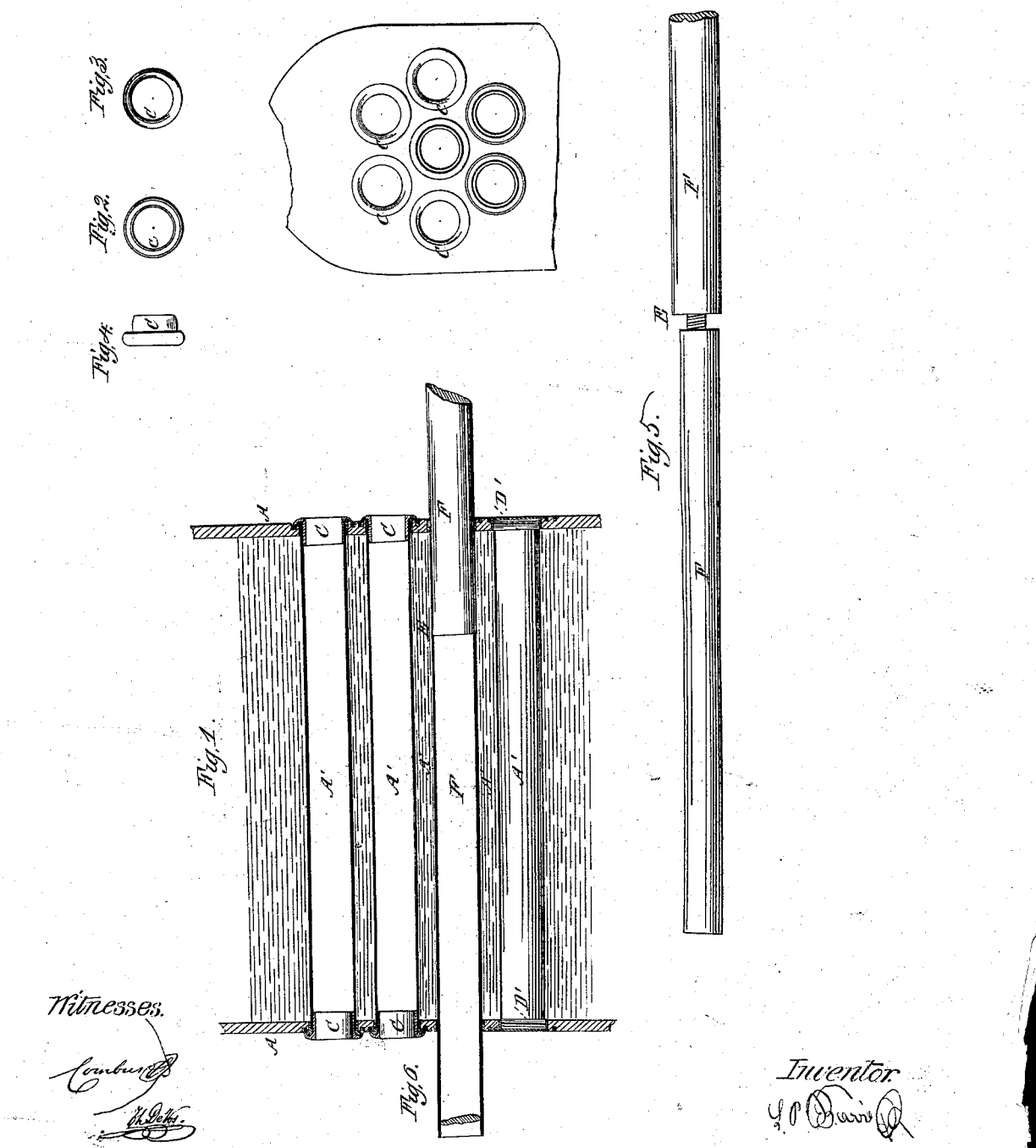

LEON P. BARRÉ, OF PARIS, FRANCE.

IMPROVEMENT IN STEAM-BOILERS.

Specification forming part of Letters Patent No. 31,772, dated March 26, 1861.

*To all whom it may concern:*

Be it known that I, LEON PIERRE BARRÉ, gentleman, of Paris, in France, and of 4 South Street, Finsbury, London, a subject of the Emperor of the French, have invented or discovered certain new and useful Improvements in Tubular Steam-Boilers; and I do hereby declare that the following is a full, clear, and exact description of the principle or character which distinguishes it from all other things before known and of the usual manner of making, modifying, and using the same.

My improvements consist, first, in an improved mode of hermetically closing the joints between the boiler-tubes and the openings in which they are inserted in the end plates of the tubular boilers of steam-engines; secondly, in an improved construction of mandrel for removing and replacing easily and separately the tubes of tubular boilers, with a view to cleaning the same from incrustations or other matters formed thereon.

To enable my invention to be better understood, I will now particularly describe the same in reference to the annexed drawings, in which—

Figure 1 represents a longitudinal section of fire-tubes; Fig. 2, a plan of the under side of a small flanged tube, Fig. 3 a front view, and Fig. 4 a side view, of the same. Fig. 5 is an elevation of a mandrel for cleaning the fire-tubes. Fig. 6 shows the mode of employing the mandrel.

The tubes A' A' being placed freely in the two orifices made in the end plates, A A, of the boiler, the closing of the joints is effected by the small cast-iron tubes C C, fitting into each of the extremities of the tubes A' and bearing on the boiler-plates A by means of circular collars with which the tubes are formed, the thickness of which varies according to requirement. These collars are concave underneath the part which bears on the plate. I form a groove round the orifices in the boiler-plates to enable the collars of the small tubes C C to bear with greater precision on the boiler-plates. Before placing the tubes A' in the plate-openings, I form on the exterior of the extremities of the tubes A' grooves D', which I surround with a bandage of hempen cloth impregnated with any suitable cement or mastic, and which grooves serve for holding the hempen cloth in its place and prevent it from slipping when the small tubes are placed in the orifices of the plates. This done, I close hermetically the joints at the openings in which the tubes are placed, by inserting therein the flange-tubes C C, the collars of which are previously coated on their under or hollow part with cement, as shown at Fig. 2. The cement is pressed down by the forcing in of the small tubes C C into the boiler-tubes A' A', and by this means the small tubes are made to adhere with force to the tubes and boiler-plate, and all escape of steam is thus prevented.

To prevent the bulging of the plates A A in large tubular steam-boilers, I can replace some of the tubes A' A', hereinbefore described, by cast-iron tubes having to one of their ends a collar which is concave underneath the part bearing on the plate. The other end is tapped and fixed tight on the plate by means of a washer and screws, care being taken to complete the joints with mastic.

The removal of the incrustations from the sides of the tubes is effected by means of the cylindrical mandrel F, Figs. 5 and 6. It is driven in the whole length of the tube, which it fills, and is stopped by a shoulder, E, at the circumference of one of the extremities of the tube. From this point it is of the same size as the tube, so as to be able to pass through the orifices of the plates. The latter part of the mandrel is made of several parts jointed together by a screw-thread, in order to be used to push out the whole length of the tubes. These joints may be taken off to shorten the mandrel when employed for tubes of a smaller length—as for tubes, for instance, of about ten feet long the mandrel must be about twenty feet long. I first introduce the first half of the mandrel into the tube up to the end plate. By means of the mandrel I then screw on a part of the other half, which I also strike with the mallet, and so on until the tube is driven out laterally and with facility, while at each blow of the mallet the incrustations are loosened and detached from the sides of the tube.

What I claim as my invention, and intend to be protected, is—

1. The fitting or fixing the tubes of tubular steam-boilers by means of small flanged tubes with collars, by means of cement for producing a steam and water tight joint between the said boiler-tubes and the end plates of tubular steam-boilers, as hereinbefore described, and represented in Figs. 1 to 4 of the annexed drawings.

2. The construction and employment of a mandrel for facilitating the cleaning of tubes in tubular boilers, as hereinbefore described, and represented in Figs. 5 and 6 of the annexed drawings.

L. P. BARRÉ.

Witnesses:
COMBRES,
C. H. DeVos.